(12) United States Patent
Obendiek et al.

(10) Patent No.: US 6,921,122 B2
(45) Date of Patent: Jul. 26, 2005

(54) FOLDING TOP FOR A CONVERTIBLE VEHICLE

(75) Inventors: Klaus Obendiek, Passau (DE); Franz Haberl, Wallerfing (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/490,577

(22) PCT Filed: Sep. 20, 2002

(86) PCT No.: PCT/DE02/03557
§ 371 (c)(1),
(2), (4) Date: Sep. 13, 2004

(87) PCT Pub. No.: WO03/024731
PCT Pub. Date: Mar. 27, 2003

(65) Prior Publication Data
US 2005/0062311 A1 Mar. 24, 2005

(30) Foreign Application Priority Data
Sep. 20, 2001 (DE) ........................ 101 46 266

(51) Int. Cl.⁷ ................................. B60J 7/14
(52) U.S. Cl. ............ 296/107.07; 296/108; 296/107.08; 296/107.17
(58) Field of Search ............................ 296/107.01, 108, 296/107.16–107.18, 107.08, 136.05, 136.06

(56) References Cited

U.S. PATENT DOCUMENTS

| | | | | |
|---|---|---|---|---|
| 3,823,977 | A | * 7/1974 | Fioravanti | .............. 296/107.17 |
| 4,895,409 | A | 1/1990 | Konishi et al. | |
| 5,542,735 | A | 8/1996 | Fuerst et al. | |
| 5,558,388 | A | 9/1996 | Fuerst et al. | |
| 5,769,483 | A | * 6/1998 | Danzl et al. | ........... 296/107.08 |
| 6,053,560 | A | 4/2000 | Rothe | |
| 6,315,349 | B1 | * 11/2001 | Kinnanen | ................... 296/108 |
| 6,502,892 | B2 | 1/2003 | Eberle | |
| 6,688,669 | B2 | * 2/2004 | Foelster et al. | ........ 296/107.01 |
| 6,688,670 | B2 | * 2/2004 | Biecker et al. | ........ 296/107.18 |
| 6,695,386 | B1 | * 2/2004 | Willard | ................. 296/107.17 |
| 6,739,645 | B2 | * 5/2004 | Papendorf et al. | .......... 296/108 |
| 6,830,284 | B2 | * 12/2004 | Guillez et al. | .............. 296/108 |
| 6,857,687 | B2 | * 2/2005 | Bruder | ....................... 296/108 |

FOREIGN PATENT DOCUMENTS

| | | |
|---|---|---|
| DE | 19642152 | 4/1998 |
| DE | 29620492 | 5/1998 |
| DE | 19752068 | 5/1999 |
| DE | 19805477 | 8/1999 |
| DE | 19934673 | 1/2001 |
| DE | 10006290 | 5/2001 |
| DE | 10062077 | 6/2002 |
| EP | 0275184 | 7/1988 |
| EP | 0554694 | 8/1993 |
| EP | 0835780 | 4/1998 |
| EP | 0936095 | 8/1999 |
| FR | 2694245 | 2/1994 |

* cited by examiner

Primary Examiner—D. Glenn Dayoan
Assistant Examiner—Greg Blankenship
(74) Attorney, Agent, or Firm—Davidson, Davidson & Kappel, LLC

(57) ABSTRACT

A folding top for a convertible vehicle includes a rear shell component, at least one front shell component, and a central shell component. The at least one front shell component, the central shell component and the rear shell component are able to be arranged as a top over an interior of the convertible vehicle in a closed condition. The at least one front shell component and the central shell component are able to be deposited in a rear area of the convertible vehicle using a first positive control mechanism. The rear shell component can be deposited in the rear area of the convertible vehicle using a second positive control mechanism. The rear shell component is mounted on a rear element that at least partially covers the rear area of the convertible vehicle. In an open condition of the top, the rear element at least partially covers the rear shell component.

20 Claims, 6 Drawing Sheets

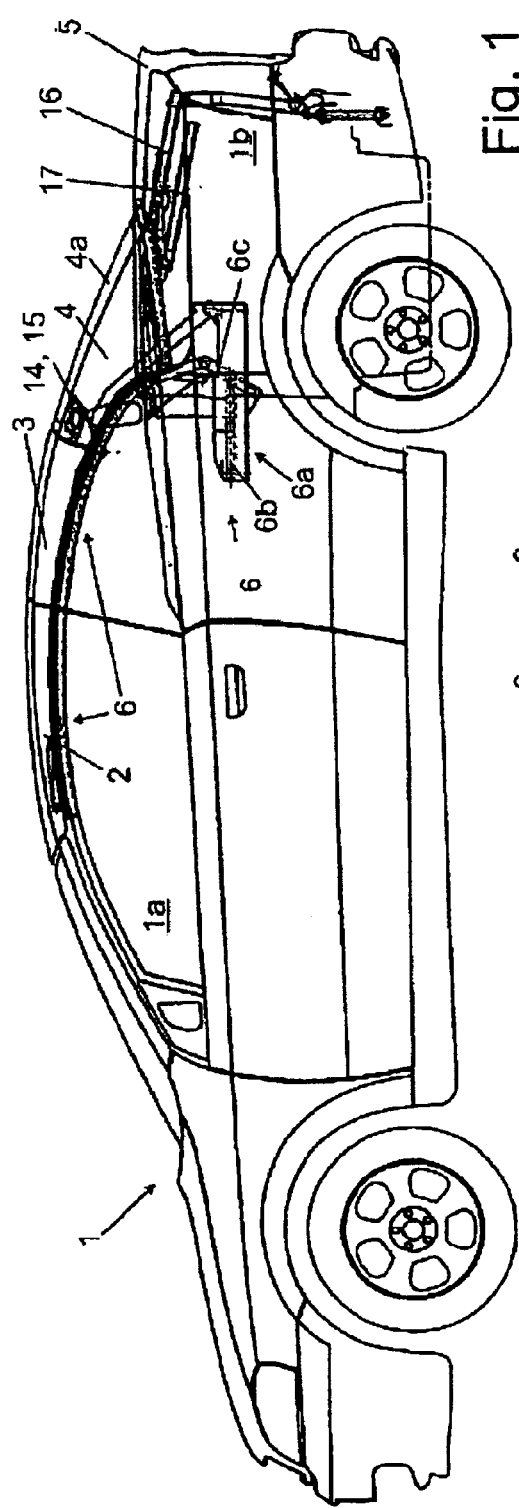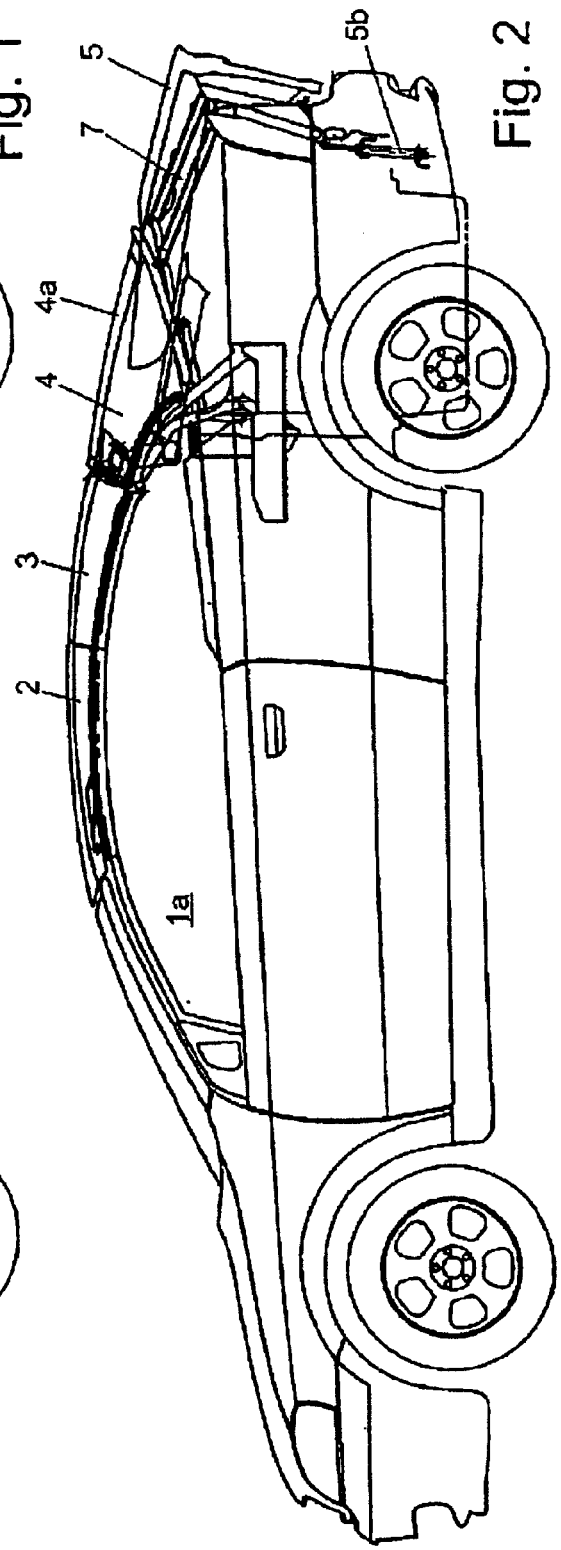

FOLDING TOP FOR A CONVERTIBLE VEHICLE

The present invention relates to a folding top for a convertible vehicle.

BACKGROUND

In the construction of modern convertible vehicles, increasing use is being made of convertible tops that comprise hard shell components that are connected to the body of the vehicle by positive control mechanisms, designed for example as link mechanisms and can be transferred automatically by means of these positive control mechanisms from a closed condition of the top to an open condition of the top, the hard shell components being deposited in a rear area of the vehicle in the open condition of the top.

DE 198 05 477 C1 discloses a top for a convertible vehicle, in which the top comprises two hard shell roof components, which are both fixed to one chain of links and can be deposited in a rear area of the vehicle by means of a drive of the chain of links during an opening process of the top. An arrangement of this kind, comprising two hard shell roof components, is not suitable for covering relatively large interiors of vehicles with, for example, four or more seats.

DE 199 34 673 C1 discloses a hard top for a convertible vehicle, in which a front, a central and a rear hard shell roof component are fixed on a common chain of links. Owing to the configuration of the chain of links, the front hard shell roof component is deposited over the central hard shell roof component when the top is opened, the central hard shell roof component coming to rest above the rear hard shell roof component, which has been transferred to a reversed position, in a rear area of the vehicle. It has proven disadvantageous here that the reversed convexity of the central and rear hard shell roof components in the deposited position does not contribute to optimum usage of the space in the rear area of the vehicle. Moreover, the rear window, which is generally provided in the rear shell component, faces an eventually remaining loading space of the vehicle underneath the stack of roof shell components, promoting damage to the rear window when the vehicle is being loaded.

DE 196 42 152 A1 discloses a top for a convertible vehicle, in which a front, a central and a rear hard shell roof component are fixed on a chain of links in such a way that, when the top is opened, the front roof component comes to rest underneath the central roof component and the central roof component comes to rest underneath the rear roof component, and furthermore a further drive apparatus in the rear area of the vehicle pivots a rear window, which can be inserted in the rear roof component, separately away from the stack of roof components.

SUMMARY OF THE INVENTION

Overall, the arrangement of all the roof components of a convertible top on a single chain of links has disadvantages inasmuch as the chain of links has to be of very sturdy design, leading to higher costs. Moreover, the restriction to a single, positively controlled link chain limits the flexibility of the design in respect of the size ratios of the roof parts, in respect of the precise deposited position and in respect of the sequence and orientation of the roof parts in the deposited position.

It is an object of the invention to provide a folding top for a convertible vehicle, in which the shell components of the top can be deposited in a rear area of a vehicle in a particularly space-saving manner.

The present invention provides a folding top for a convertible vehicle having a rear shell component, at least one front shell component, and a central shell component, it being possible for the front, the central and the rear shell component to be arranged as a top over an interior of the convertible vehicle in a closed condition, and it being possible for the front shell component and the central shell component to be deposited in a rear area of the convertible vehicle using a first positive control mechanism. In addition, the rear shell component can be deposited in the rear area of the convertible vehicle using a second positive control mechanism, the rear shell component is mounted on a rear element that at least partially covers the rear area of the convertible vehicle, and, in an open condition of the top, the rear element at least partially covers the rear shell component.

According to the invention, two positive control mechanisms are provided, the first positive control mechanism moving the front and the central shell component and the second positive control mechanism moving the rear shell component, with the advantageous result that all the shell components are no longer arranged on a common chain of links.

In a preferred development of a folding top according to the invention, a rear element that can be pivoted counter to the direction of travel is provided, which can be pivoted open during the opening movement of the top and covers the deposited shell components of the top after being closed. At the same time, the rear shell component is preferably mounted movably on the rear element, allowing it to be moved under the rear element, preferably by means of a linear guide, in a combination of a pivoting movement and a linear motion. A linear motion of this type means that the rear shell component takes up a particularly small motion space.

It is particularly preferred if the movement of the rear shell component relative to the rear element and the pivoting of the rear element relative to the convertible vehicle can be driven by means of a second and a third drive apparatus, enabling both motions to take place automatically in a correlated manner, e.g. by means of computer control. The third drive apparatus is preferably embodied as a rotary hydraulic cylinder, in which the linear motion of a hydraulic piston is converted in a space-saving manner to a rotary motion of a drive pinion.

The first positive control mechanism preferably comprises a link mechanism, which is fixed pivotably on the convertible vehicle by means of a first and a second main link. The link mechanism preferably comprises a chain made up of at least three four-bar linkages, the two main links forming links of the first four-bar linkage and the central shell component being fixed on the second four-bar linkage and the front shell component being fixed on the third four-bar linkage. A chain of links of this kind can be driven in a known manner, allowing the front and the central shell component to be deposited automatically in a rear area of the vehicle by a drive of the chain of links.

In a preferred embodiment, the drive of the chain of links is designed as a rotary hydraulic cylinder, ensuring a particularly space-saving and nevertheless robust drive of the chain of links. Alternatively, however, the chain of links can also be driven by means of a conventional hydraulic or pneumatic cylinder with a connecting rod or by means of an electric motor.

In a particularly preferred embodiment of the present invention, the front shell component is located in the same sense over the central shell component and the rear shell component is located in the same sense over the front shell component in a deposited position of the folding top. This allows a particularly space-saving arrangement of the deposited shell components in an open condition of the top.

To make the folding top according to the invention sufficiently sturdy, especially in the event of an accident in which the vehicle rolls over, reinforcements are provided on the rear shell component, the rear shell component forming a C pillar of the vehicle in a closed condition of the top and the C pillar being of particularly sturdy construction owing to the reinforcements.

In a folding top according to the invention, the rear shell component is particularly preferably connected, in a closed state of the top, to the central shell component via a slotted-guide mechanism. In this case, the slotted-guide mechanism is advantageously configured in such a manner that, at least in one section of an opening movement of the top, the shaping of the slotted-guide mechanism forces a relative movement of the two shell components with respect to each other, the movement corresponding to a pivoting movement about a pivot point situated outside the shell components. This ensures, using simple means, that the shell components do not collide with one another in a first section of the opening movement or, in a reversal of the kinematics, in a last section of the closing movement.

Further advantages and features of the invention will emerge from the exemplary embodiment described below and from the claims.

BRIEF DESCRIPTION OF THE DRAWINGS

A preferred exemplary embodiment of a folding top according to the invention will be described below and explained in greater detail with reference to the attached drawings, in which FIG. 1 shows a schematic side view of a convertible vehicle with a folding top according to the invention in a closed condition.

FIG. 2 shows a convertible vehicle in accordance with FIG. 1 after a first stage of an opening movement of the folding top.

DETAILED DESCRIPTION

Figure 3:
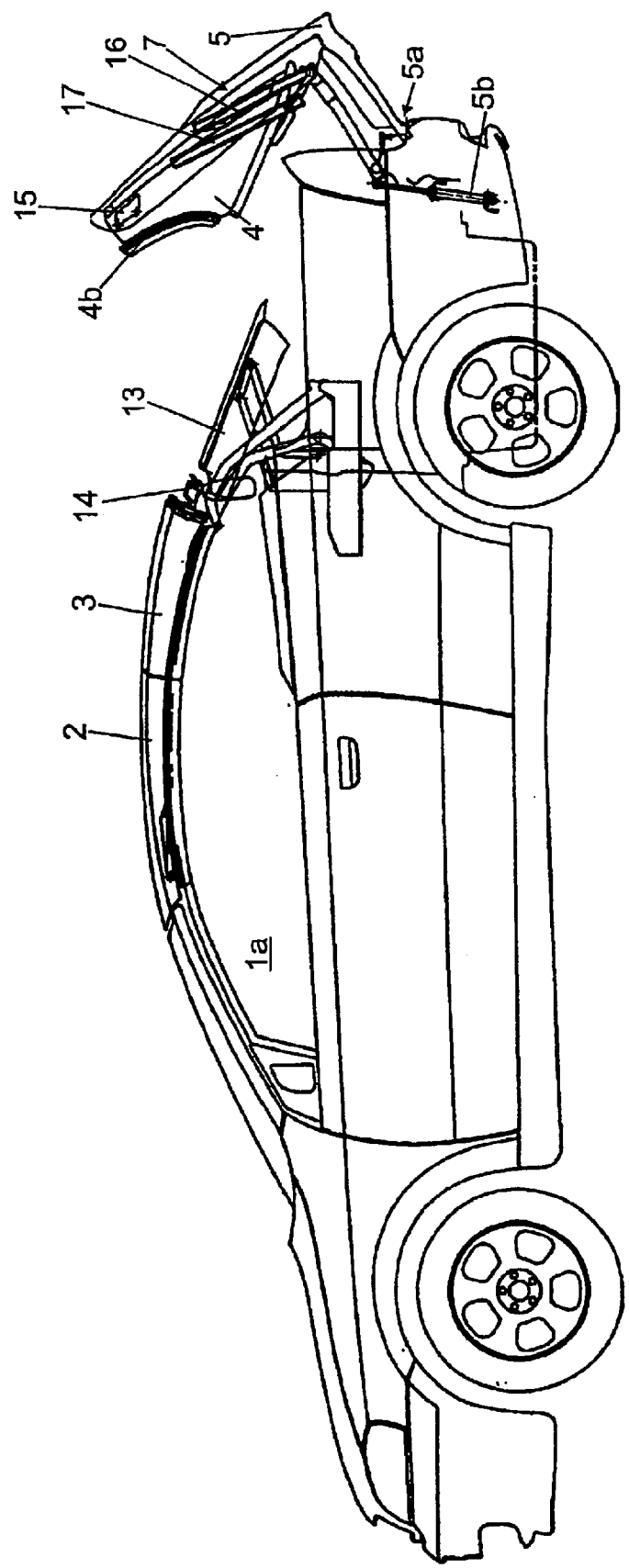
FIG. 3 shows a convertible vehicle in accordance with FIG. 1 after a second stage of an opening movement of the folding top.

FIG. 1 shows a convertible vehicle 1, in which a folding top according to the invention is arranged in a closed condition over an interior space 1a of the vehicle. The folding top comprises a first positive control mechanism 6, which is fixed in a moveable manner on the convertible vehicle 1 by means of two main links 8, 9. Fixed on the first positive control mechanism 6 are a front shell component 2 and a central shell component 3 of the folding top. A rear shell component 4 of the folding top, which comprises a rigid rear window 4a, is fixed movably on a rear element 5 of the convertible vehicle by means of a linear guide 7. A trunk lid (not illustrated), which can be pivoted open in the direction of travel in a known manner, is arranged on the rear element 5 to enable loading of a volume present in a rear area 1b of the convertible vehicle 1.

Figure 8:
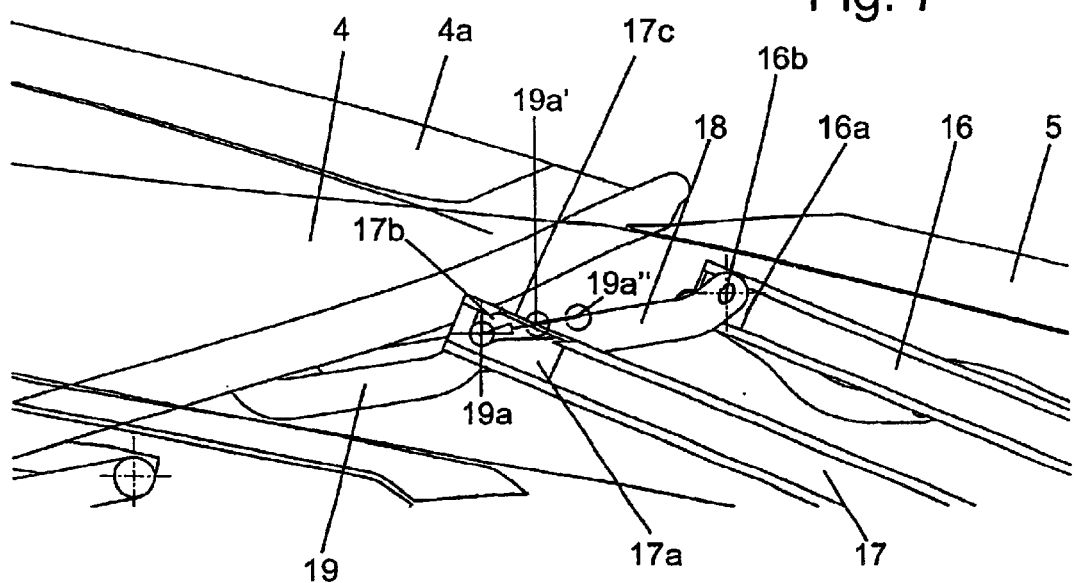
FIG. 8 shows a side view of a detail for guiding the rear shell component of a folding top according to the invention.

As FIG. 8, in particular, shows in detail, the linear guide essentially comprises two rails 16, 17 connected fixedly to the rear element 5, the first rail 16 being arranged above the second rail 17. A first slider 16a is accommodated in the first rail 16 in such a manner that it can be moved along the first rail 16. A second slider 17a is accommodated in the second rail 17 in such a manner that it can be moved along the second rail 17. A recess 17c is provided in the upper end region of the second rail 17, with a lock holder 17b, which is provided on the second slider 17a, overlapping with the recess 17c in an end position of the slider 17a.

A first holder 18 and a second holder 19 are fixed in the rear region of the rear shell component 4. The movable fixing of the rear shell component 4 on the rear element 5 is provided firstly by the fact that the first holder 18 is connected in an articulated manner to the first slider 16a in a joint 16b. Secondly, the second holder 19 has a pin 19a at its end. Depending on the state of the top, this pin 19a is situated inside or outside the lock holder 17b of the second slider 17a (see indicated positions 19a' and 19a" of FIG. 8).

Figure 7:
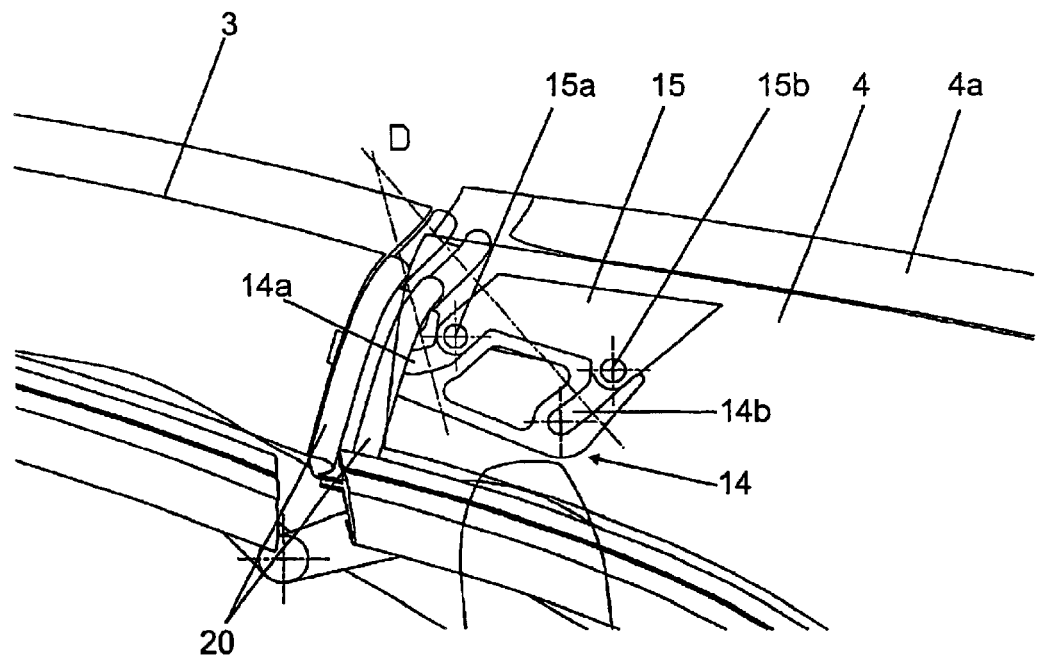
FIG. 7 shows a side view of a detail of a folding top according to the invention for guiding two roof parts with respect to each other.

FIG. 7, in particular, shows the manner in which the rear shell component 4 can be fixed releasably on the central component 3. In this case, a latch element 15 having two pins 15a and 15b, which are spaced apart from each other essentially in the longitudinal direction of the vehicle, is fixed in the end region of the rear shell component, which region faces the central shell component. A slotted element 14 which corresponds to the latch element 15 and has a first slot-like recess 14a assigned to the first pin 15a and a second slot-like recess 14b assigned to the second pin 15b is fixed on the central shell component 3. The two slot-like recesses 14a, 14b are shaped differently and in such a manner that, when the two pins 15a, 15b engage in the associated, slot-like recesses 14a, 14b, a movement of the rear shell component 4 relative to the central shell component 3 is possible only in the form of a pivoting movement running about a virtual pivot point D. This movement which is forced by the interaction of the slotted element 14 and latch element 15 prevents the mutually facing end sides of the central shell component 3 and the rear shell component 4 from colliding with each other at the start of an opening process or toward the end of a closing movement of the folding top according to the invention. In addition, the previously described positively controlled movement ensures that end-side seals 20 which are provided on the shell components 3, 4 are moved with respect to each other in a particularly low-wearing manner.

A first stage of an opening movement of the top is shown in FIG. 2. In this case, first of all, starting from the closed position of the top according to FIG. 1, the rear element has been pivoted open for a short distance counter to the direction of travel by means of a third drive apparatus 5b. In the process, the pin 19a, which has been described previously, has been moved, starting from a position 19a" corresponding to the closed top, via an intermediate position 19a' into a position defined by stopping in the lock holder 17*b* of the second slider while the rear shell component 4 has performed a rotational movement caused by the rotational connection of the holder 18 to the first slider 16*a*. This rotational movement of the rear shell component 4 with respect to the rear element 5 can be seen in particular from a comparison of FIG. 1 and FIG. 2 in respect of their relative positions with respect to each other. During the previously described, first section of the opening movement of the folding top according to the invention, the previously described pivoting of the rear shell component 4 with respect to the central component 3 about the virtual pivot point D also takes place. Approximately starting from the position of the rear shell component 4 according to FIG. 2, the pins 15*a*, 15*b* no longer engage in the slot-like recesses 14*a*, 14*b*, and the rear shell component 4 is no longer connected to the central shell component 3.

FIG. 3 shows a second stage of an opening movement of the top, in which the rear shell component 4 has already moved away from the central shell component 3 in the direction of the vehicle rear, with the rear element 5 being pivoted open counter to the direction of travel. In this case, the rear shell component 4 has been moved, by means of its previously described securing on the sliders 16*a*, 17*a*, along the linear guide 7 and under the rear element 5. Since the first section of the opening movement of the top (see FIG. 2) has resulted in a virtually parallel alignment of the rear shell component 4 and rear element 5, the displacement of the rear shell component 4 under the rear element 5 proceeds in a particularly space-saving manner. The displacement along the linear guide 7 is carried out by means of a second drive apparatus (not illustrated).

In particular, FIG. 3 also shows that the rear shell component 4 is provided with a reinforcement 4*b* in an area in which it forms a C pillar of the convertible vehicle 1 in the closed condition of the top in accordance with FIG. 1.

Figure 4:
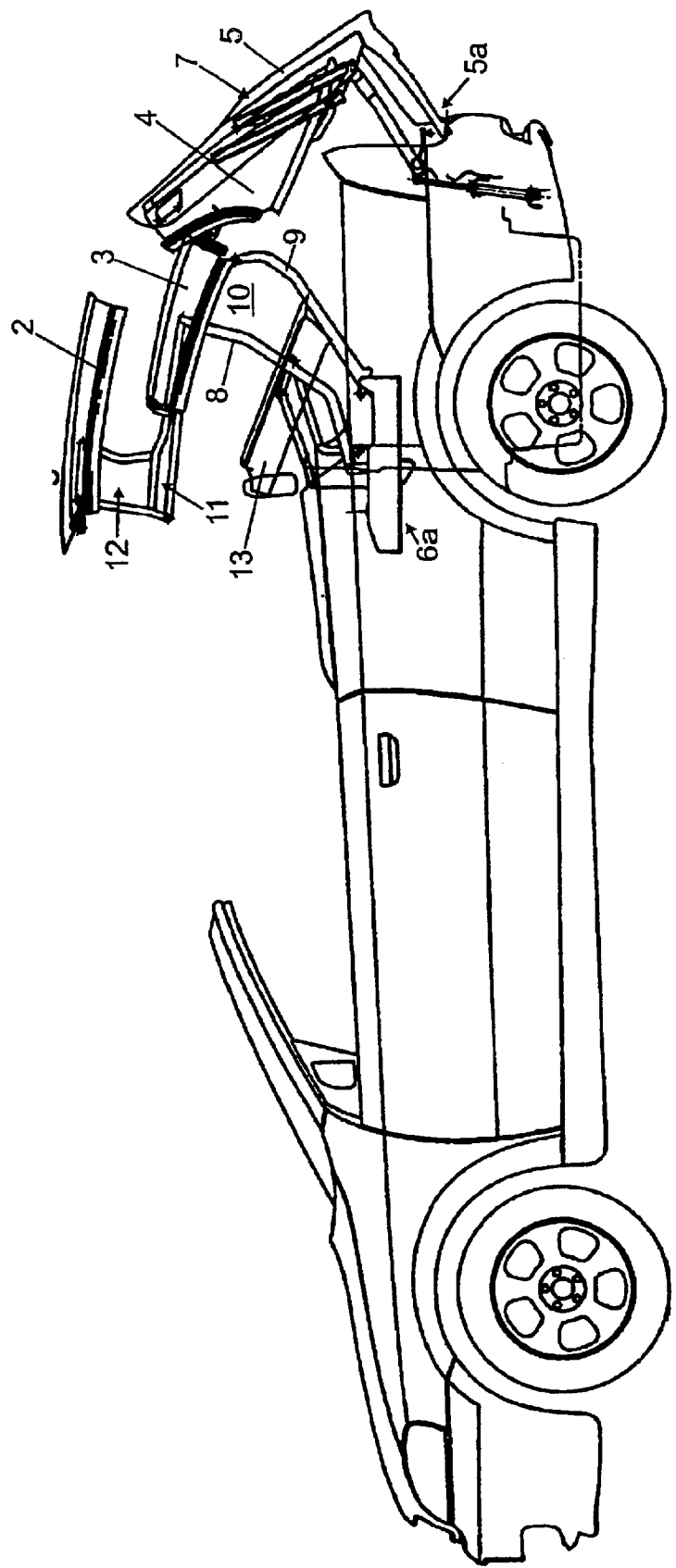
FIG. 4 shows a convertible vehicle in accordance with FIG. 1 after a third stage of an opening movement of the folding top.

In a third stage of an opening movement of the folding top in accordance with FIG. 4, the rear element 5 and rear shell component 4 are in the same position as in FIG. 3. The rear element 5 is connected to the convertible vehicle 1 by means of a four-bar linkage 5*a* in the area of a rear crossmember, which is usually arranged directly in front of a rear bumper of the vehicle.

A second positive control mechanism, by means of which the rear shell component 4 can be deposited in the rear area 1*b* of the convertible vehicle 1, comprises the linear guide 7 and the rear element 5.

FIG. 4 shows that, in the third stage of a top opening movement, the front shell component 2 and the central shell component 3 are moved in such a way by means of a movement of the first positive control mechanism 6 under the action of a first drive apparatus 6*a* that the front shell component 2 is pivoted over the central shell component 3. As shown, in particular, in FIG. 3, the first positive control mechanism 6 comprises a link mechanism 6, which comprises a chain comprising a first four-bar linkage 10, a second four-bar linkage 11 and a third four-bar linkage 12. In this arrangement, the first main link 8 and the second main link 9 each form links of the first four-bar linkage 10, the base of which is formed by the convertible vehicle 1. The coupler of the first four-bar linkage 10 simultaneously forms a link of the second four-bar linkage 11. A link of the second four-bar linkage 11 simultaneously forms a base of the third four-bar linkage 12. The central shell component 3 is fixed on a link of the second four-bar linkage 11. A second link of the second four-bar linkage 11 is connected to one of the links of the third four-bar linkage 12 and thus drives the third four-bar linkage 12, on the coupler of which the front shell component 2 is fixed. The entire link mechanism 6 is driven by means of the drive apparatus 6*a* which comprises a hydraulic cylinder 6*b* and is fixed on the convertible vehicle 1. The hydraulic cylinder 6*b* is connected to at least one of the main links 8, 9 of the first four-bar linkage 10 via an intermediate link 10.

Figure 5:
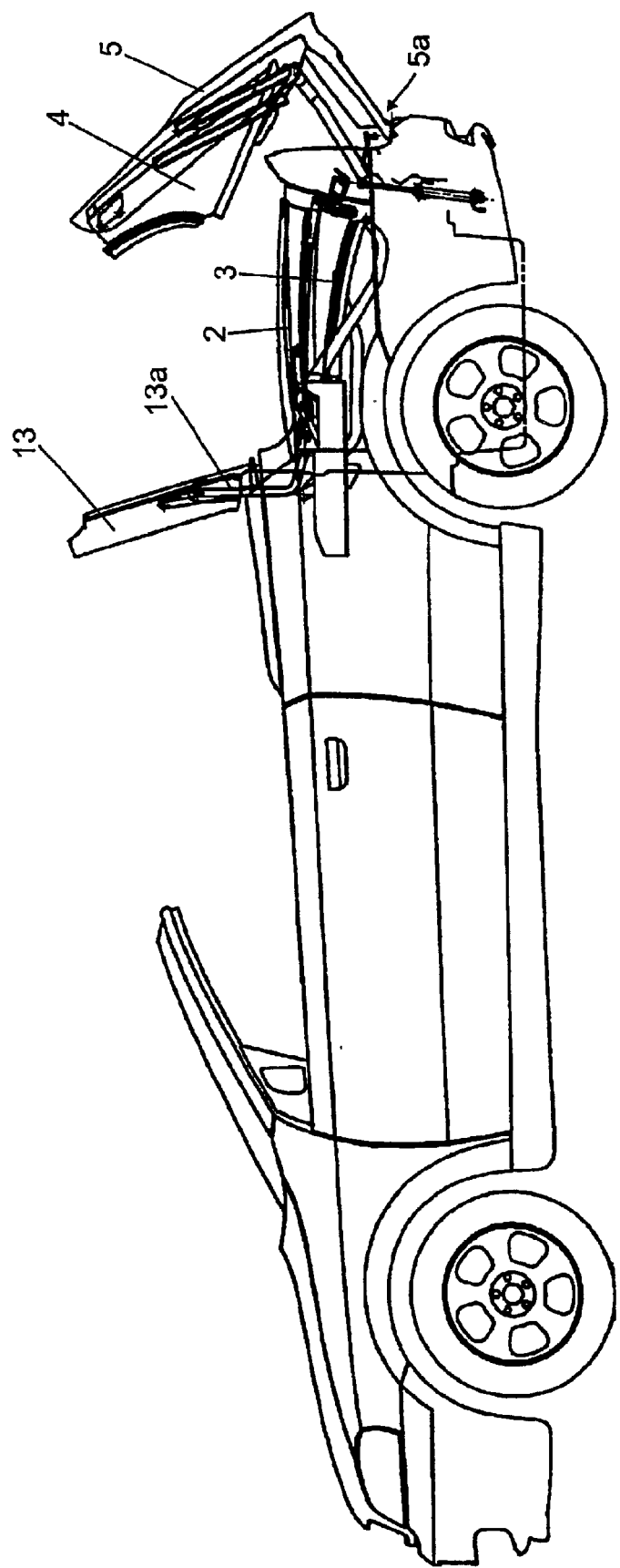
FIG. 5 shows a convertible vehicle in accordance with FIG. 1 after a fourth stage of an opening movement of the folding top.

In the open position of the rear element 5 illustrated in FIG. 5, with the rear roof component 4 pivotally connected to the rear element 5, it is possible for the front shell component 2 and the central shell component 3 to pivot into the rear area 1*b* of the convertible vehicle 1. An end position of this pivoting motion of the front and the central shell component 2, 3 into the rear area 1*b* is shown in FIG. 5, the rear element 5 being in an open position pivoted counter to the direction of travel.

Figure 6:
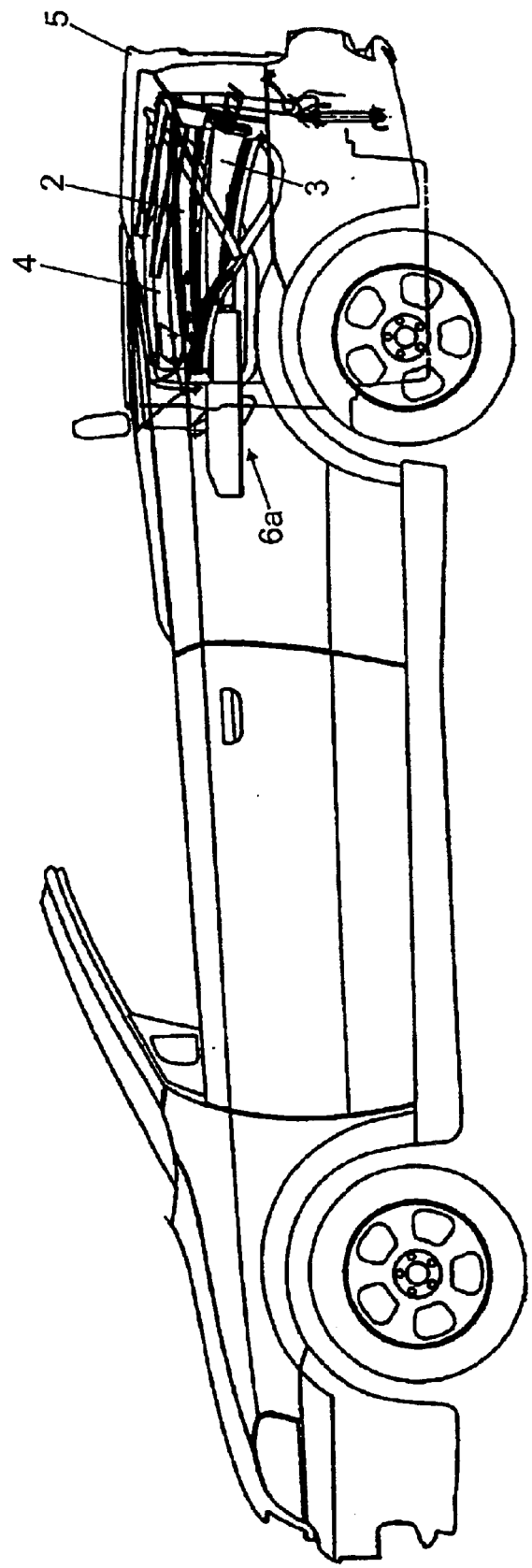
FIG. 6 shows the convertible vehicle in accordance with FIG. 1 with an open folding top deposited in a rear area of the vehicle.

In a final portion of the top opening movement, the rear element 5 is now pivoted shut again, a deposited position of the folding top thus being achieved in accordance with FIG. 6. Here, all three shell components 2, 3, 4 are essentially in the same orientation as in the closed condition of the folding top in accordance with FIG. 1. In this orientation, the front shell component 2 is above the central shell component 3, the rear shell component 4 being above the front shell component 2. All three shell components 2, 3, 4, which are arranged essentially in a stack one above the other, are at least partially covered by the rear element 5.

The space-saving arrangement of the three shell components of the illustrated preferred embodiment of a folding top according to the invention is assisted, in particular, by the unidirectional convexity of the three shell components in the deposited position in accordance with FIG. 6 and by the fact that the front shell component 2 is arranged above the central shell component 3 and below the rear shell component 4. This makes possible a smaller overall space requirement of the folding top according to the invention in the deposited position of the top than the overall volume theoretically enclosed by the rear shell component, for example.

The pivoting of the rear shell component 4 relative to the rear element 5 is accomplished by means of the second drive apparatus (not illustrated) and the pivoting of the rear element 5 relative to the convertible vehicle 1 is accomplished by means of the third drive apparatus 5*b*. Overall, therefore, a first drive apparatus 6*a* for driving the first positive control mechanism 6 and hence for pivoting the front shell component 2 and the central shell component 3, a second drive apparatus (not illustrated) for displacing the rear shell component 4 relative to the rear element 5, and a third drive apparatus 5*b* for pivoting the rear element 5 together with the rear shell component 4 relative to the convertible vehicle 1 are provided. The first drive apparatus 6*a* and the third drive apparatus 5*b* are each embodied as hydraulic cylinders. As an alternative, however, it is also possible for one or more of the three drive apparatuses to be embodied as electric motors. Automatic control of the three drive apparatuses is performed by a common electronic control system, a well-defined sequence of the overall opening movement of the folding top according to the invention thus being ensured by means of the electronic control system. The electronic control system comprises both signal transmitters for switching the electric motors or hydraulic valves and sensors for feeding back the position of the respective drive apparatus or positive control mechanism. In particular, a particularly time-saving motion with greater esthetic appeal to the external observer during the opening and closure of the folding top is made possible by appropriate design of this electronic control system, it being possible for part of the opening movement of the front and central shell components 2, 3 to take place even during the opening movement of the rear element or while the rear shell component 4 is simultaneously being displaced relative to the rear element 5.

Loading the trunk volume in the rear area 1b with the top open in accordance with FIG. 6 is facilitated, in particular, by the advantageous stacking and orientation of the shell components 2, 3, 4 (see FIG. 6), the fact that the rear shell component 4 is at the top effectively preventing damage to the rear window 4a while the trunk volume is being loaded.

A further movable and driven element of the folding top according to the invention is the covering device 13 shown in FIGS. 1 to 6. This is a covering which is positioned in the region of a conventional rear parcel shelf, in the end positions of the folding top according to the invention, and is connected to the convertible vehicle 1 by means of a drivable link mechanism 13a. Driven by a dedicated drive apparatus (not illustrated) and coordinated by means of the common electronic control system, the covering device 13 pivots open during the initial phase of the opening movement of the top (see FIGS. 2 to 5), so that sufficient movement space is available for depositing, in particular, the front and central shell components 2, 3 of the folding top according to the invention in the rear region 1b of the convertible vehicle 1. In a last portion of the opening movement of the top, the covering device 13 pivots shut again, in which case a surface in the rear region of the convertible vehicle 1 is formed jointly by the covering device 13 and the rear element 5.

The closing movement of a folding top according to the invention takes place in a corresponding manner in a reversal of the previously described kinematics.

What is claimed is:

1. A folding top for a convertible vehicle, comprising:
   a rear shell component;
   at least one front shell component; and
   a central shell component,
   wherein the at least one front shell component, the central shell component and the rear shell component are capable of being arranged as a top over an interior of the convertible vehicle in a closed condition,
   wherein the front shell component and the central shell component are capable of being deposited in a rear area of the convertible vehicle using a first positive control mechanism,
   wherein the rear shell component is capable of being deposited in the rear area of the convertible vehicle using a second positive control mechanism,
   wherein the rear shell component is mounted on a rear element that at least partially covers the rear area of the convertible vehicle, and
   wherein, in an open condition of the top, the rear element at least partially covers the rear shell component.

2. The folding top as claimed in claim 1, wherein the second positive control mechanism comprises a linear guide.

3. The folding top as claimed in claim 1, wherein the first positive control mechanism comprises a link mechanism, and wherein a first main link and a second main link of the link mechanism are fixed pivotably on the convertible vehicle.

4. The folding top as claimed in claim 3, wherein the link mechanism comprises a chain that includes a first four-bar linkage, a second four-bar linkage and a third four-bar linkage, wherein the central shell component is fixed on the second four-bar linkage and the front shell component is fixed on the third four-bar linkage, and wherein the first and the second main links are links of the first four-bar linkage.

5. The folding top as claimed in claim 1, wherein the first positive control mechanism is drivable using a first drive apparatus.

6. The folding top as claimed in claim 5, wherein the first drive apparatus comprises a hydraulic or pneumatic drive cylinder.

7. The folding top as claimed in claim 5, wherein the first drive apparatus comprises a rotary hydraulic cylinder.

8. The folding top as claimed in claim 1, wherein the rear shell component is mounted on the rear element using a linear guide.

9. The folding top as claimed in claim 8, wherein the linear guide comprises a first rail and a second rail disposed below the first rail.

10. The folding top as claimed in claim 9, wherein the rear shell component is connected in a rotatable and linearly movable manner to one of the first and second rails.

11. The folding top as claimed in claim 9, wherein the rear shell component is releasably fixable on one of the rails.

12. The folding top as claimed in claim 2, wherein the second positive control mechanism comprises the rear element and the linear guide.

13. The folding top as claimed in claim 1, wherein the rear shell component is moveable relative to the rear element using the second positive control mechanism.

14. The folding top as claimed in claim 1, wherein the second positive control mechanism is drivable by means of a second drive apparatus.

15. The folding top as claimed in claim 1, further comprising a third drive apparatus for pivoting the rear element.

16. The folding top as claimed in claim 15, wherein the second positive control mechanism comprises the third drive apparatus.

17. The folding top as claimed in claim 1, wherein the rear element is pivotable relative to the convertible vehicle counter to the direction of travel.

18. The folding top as claimed in claim 1, wherein the front shell component is disposed over the central shell component and the rear shell component is arranged over the front shell component in a deposited position, each of the front, central and rear shell components being oriented in the same direction.

19. The folding top as claimed in claim 1, the rear shell component form a C pillar, provided with a reinforcement, of the convertible vehicle in the closed condition.

20. The folding top as claimed in claim 1, wherein the rear shell component is releasably fixed on the central shell component using a slotted-guide mechanism in the closed state of the folding top, the slotted-guide mechanism being shaped in such a manner that, at least during part of the opening movement of the folding top, the slotted guide mechanism forces a pivoting of the rear roof part relative to the central roof part about a virtual pivot point D disposed at a distance from the roof parts.

* * * * *